(12) United States Patent
Bijlsma

(10) Patent No.: US 6,586,772 B2
(45) Date of Patent: Jul. 1, 2003

(54) DISPLAY DEVICE WITH COLOR FILTER COVERING PORTION OF REFLECTING PART

(75) Inventor: Sipke Jacob Bijlsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 35 days.

(21) Appl. No.: 09/864,474

(22) Filed: May 24, 2001

(65) Prior Publication Data

US 2001/0045560 A1 Nov. 29, 2001

(30) Foreign Application Priority Data

May 26, 2000 (EP) .............................................. 00201880

(51) Int. Cl.[7] .............................................. H01L 29/04
(52) U.S. Cl. .............................. 257/72; 257/66; 257/59
(58) Field of Search ............................... 257/72, 69, 66, 257/59

(56) References Cited

U.S. PATENT DOCUMENTS

| | | | |
|---|---|---|---|
| 5,929,830 A | * 7/1999 | Lips | 345/88 |
| 6,008,872 A | * 12/1999 | den Boer et al. | 349/106 |
| 6,084,650 A | 7/2000 | Sekiguchi | 349/106 |
| 6,384,886 B2 | * 5/2002 | Yamazaki et al. | 349/113 |
| 6,426,787 B1 | * 7/2002 | Satake et al. | 349/138 |

FOREIGN PATENT DOCUMENTS

| | | | |
|---|---|---|---|
| WO | WO9827681 | 6/1998 | H04L/1/20 |
| WO | WO9963671 | 12/1999 | H03M/5/14 |
| WO | WO0010165 | 2/2000 | G11B/7/095 |
| WO | WO0017872 | 3/2000 | G11B/20/10 |

OTHER PUBLICATIONS

Patent Abstracts of Japan, vol. 1999, No. 08, Jun. 1999, & JP11084358A (Citizen Watch Co Ltd), Mar. 1999, Abstract.
Publication by Jan W.M. Bergmans, "Digital Baseband Transmission and Recording" pp. 301–372.

* cited by examiner

Primary Examiner—Richard Elms
Assistant Examiner—Brad Smith

(57) ABSTRACT

A display device includes a first substrate provided with first picture electrodes having reflecting parts a second transparent substrate provided with transparent second picture electrodes, with pixels at areas of overlapping parts of the first and second picture electrodes, an electro-optic material between the first and second substrates and a color filter present on the first substrate, wherein viewed transversely to the first substrate, within a pixel, the color filter partly covers the reflecting part of the first picture electrode. By such a configuration, light from an uncovered part of a picture electrode is mixed with light from the part of the electrode that is covered by the color filter to increase the intensity of the display.

10 Claims, 2 Drawing Sheets

DISPLAY DEVICE WITH COLOR FILTER COVERING PORTION OF REFLECTING PART

The invention relates to a display device comprising an electro-optical material between a first substrate provided with picture electrodes having reflecting parts, and a second transparent substrate provided with transparent picture electrodes with pixels at the area of overlapping parts of picture electrodes, and further comprising a color filter. Such display devices are used in, for example, (portable) display screens in hand-held telephones, organizers but also in, for example, automotive uses.

A (transflective) display device of the type described in the opening paragraph is described in WO 99/28782. In the reflective state, ambient light is reflected by the reflecting electrode of, for example, silver or aluminum. These electrodes pass light in the transmissive state. To this end, the reflecting material has apertures at the location of pixel elements. The color filter is provided across the electrodes or is provided across an electrode on the second substrate.

A first problem in these types of display devices is the fact that the color saturation in the transmissive part of a pixel usually differs from that in the reflective part, notably when the display device is based on a polarization effect. This is due to the fact that light from a backlight determines the image in the transmissive part, while the ambient light determines the image in the reflective part. The light from a backlight passes the color filter only once, whereas the ambient light passes the color filter twice due to reflection. Consequently, and due to the difference in light source (a backlight with light from, for example, a TL tube or LED or from more external light sources) different requirements as regards the transmissive part and the reflective part of the display device are imposed on the color filter.

Another problem occurs when birefringent material, for example, twisted nematic (liquid crystal) material is used in such a display device. The transmission/voltage characteristic is then not the same in transmission as in reflection.

It is, inter alia, an object of the present invention to eliminate one or more of the above-mentioned drawbacks.

To this end, a display device according to the invention is characterized in that, viewed transversely to the first substrate, and within a pixel, a color filter partly covers the reflecting part of a picture electrode. When used in reflection, light from the uncovered part of the picture electrode is mixed, as it were, with light from the part of the picture electrode covered by the color filter. The color saturation behavior can now be adjusted for reflection by varying the ratio between covered and uncovered surface so that it can be rendered substantially equal to that in transmission.

An additional advantage is that due to the difference in thickness of the layer of liquid crystal material, the transmission/voltage characteristic at the area of the part of the picture electrode which is not covered by the color filter has a different variation than at the area of the uncovered part. Consequently, these characteristics will be more equal to each other for transmission and reflection in, for example, a reflective LCD with a twist angle of 60°.

These and other aspects of the invention are apparent from and will be elucidated with reference to the embodiments described hereinafter.

In the drawings:

FIG. 2 shows a part of the device not shown in FIG. 1, while

The Figures are diagrammatic and not drawn to scale. Corresponding components are generally denoted by the same reference numerals.

Figure 1:
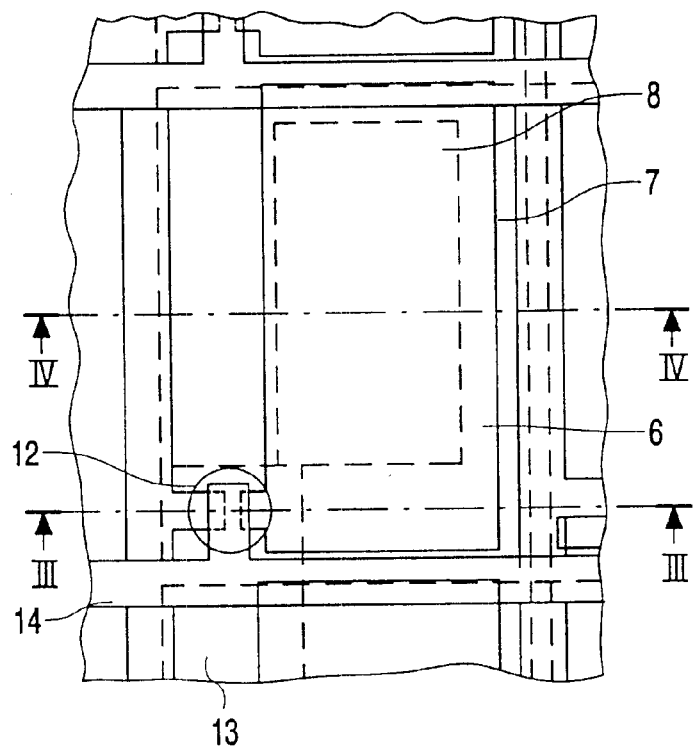
FIG. 1 is a plan view of a part of a display device according to the invention.
Figure 2:
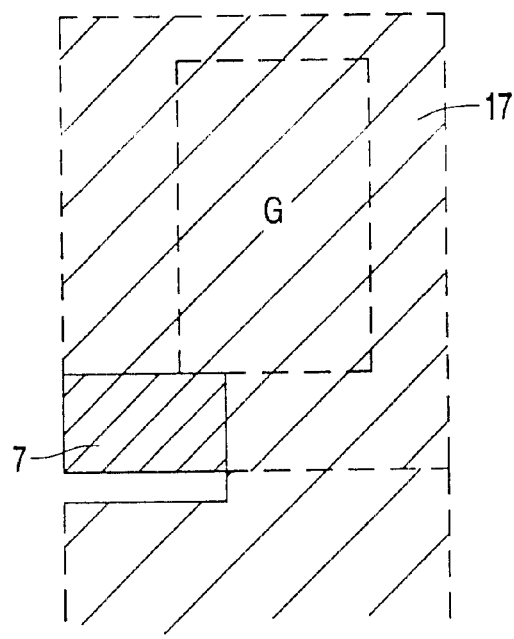
Figure 3:
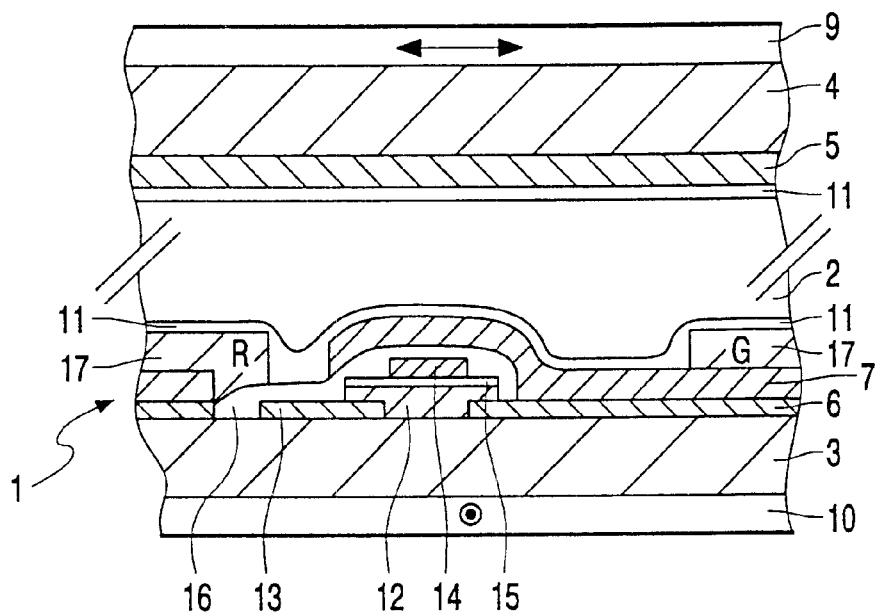
FIG. 3 is a cross-section taken on the line III—III in FIGS. 1, 2.
Figure 4:
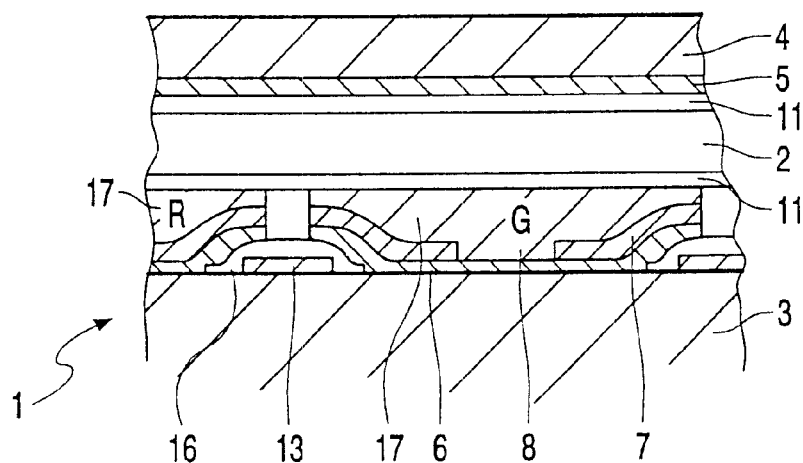
FIG. 4 is a cross-section taken on the line IV—IV in FIGS. 1, 2.

FIGS. 1 and 2 are diagrammatic plan views and FIG. 3 is a cross-section of a part of a display device comprising an electro-optical display cell, in this example a liquid crystal cell 1 with a twisted nematic liquid crystal material 2 which is present between two transparent substrates 3, 4 of, for example, glass, provided with electrodes 5, 6. The electrode 5 is made of a light-transmissive material such as indium tin oxide, while the electrode 6 in this embodiment also consists of indium tin oxide and is covered with a reflective or diffusely reflecting material 7 such as, for example, aluminum or silver. The reflecting material is chosen to be so thick (150–400 nm) that no light is passed. To pass, light from a light source (backlight) (not shown) in the transmissive state, the reflecting electrode material is provided with at least an aperture 8 which covers, for example minimally 5% and maximally 70% of the electrode surface. Upon reflective use, incident light is reflected by the electrodes 7, whereas upon use in transmission, the aperture 8 passes a sufficient quantity of light from a backlight (not shown).

Different electro-optical effects can be used, particularly liquid crystal effects such as (S)TN, guest-host, PDLC, ferroelectrics etc.

In this embodiment, the device comprises two polarizers 9, 10 whose direction of polarization is mutually perpendicularly crossed in this case. The device further comprises orientation layers 11 which orient the nematic liquid crystal material on the inner walls of the substrates, in this embodiment in such a way that the liquid crystal layer has a twist angle of approximately 90 degrees. In this case, the liquid crystal material has a positive optical anisotropy and a positive dielectric anisotropy.

In the relevant embodiment, an Active Matrix LCD (AMLCD) is shown. In this matrix, the picture electrode 6 is connected in an electrically conducting manner to the drain of a TFT transistor 12 realized in (amorphous) silicon. The source is connected in an electrically conducting manner to a (column) electrode 13, while the TFT transistor is selected by means of row electrodes 14 contacting the gate of the TFT transistor 12. The gate electrode is insulated from the silicon by a thin layer of gate oxide 15. The TFT transistors 12 as well as the electrodes 13, 14 are insulated from the reflecting electrode 7 by means of a patterned insulation layer 16.

The pixels are provided with color filters 17. These may be arranged as separate color filter parts per pixel but alternatively, as in the present embodiment, as continuous strips (see particularly FIG. 2).

According to the invention, the color filter 17 covers the reflecting electrode 7 only partly. The extent of overlap determines how much uncolored (white) light is mixed during reflection with reflected colored light (colored by the color filter). The color saturation is adjusted in dependence on the extent of overlap. Other factors, such as the color properties of the separate elements of the color filter also play a role. Some mixing already occurs when the color filter covers at least 10% of the reflecting part of the picture electrode. To be able to reflect a sufficient quantity of colored light, it is desirable that the color filter covers at least 50% of the reflecting part of the picture electrode. The effect still occurs up to a coverage 95%.

At the area of the free electrode 7, the liquid crystal layer 2 will have a larger thickness than at the area of the color filter 17. This usually involves a shift of the transmission/voltage characteristic to higher values. However, in transflective display devices, the transmission/voltage characteristic for transmission is different anyway from that for reflection. However, it surprisingly appears that the partial omission of the color filter 17 in a display device as described causes the transmission/voltage characteristic for transmission and that for reflection to coincide to a larger extent.

The invention is of course not limited to the embodiment shown. For example, instead of active display devices, passive transflective display devices may be used alternatively. Moreover, plasma channel drive (PALC) is possible. The (patterned) color filter may also be present on the other substrate.

The protective scope of the invention is not limited to the embodiments shown. The invention resides in each and every novel characteristic feature and each and every combination of features. Reference numerals in the claims do not limit the protective scope of these claims. The use of the verb "to comprise" and its conjugations does not exclude the presence of elements other than those stated in the claims. The use of the article "a" or "an" preceding an element does not exclude the presence of a plurality of such elements.

What is claimed is:

1. A display device, comprising:
    a first substrate having a first picture electrode disposed thereon, said first picture electrode including a transparent layer and a reflective layer disposed thereon;
    a second transparent substrate having a transparent second picture electrode disposed thereon, with a pixel at an area where the first and second picture electrodes overlap;
    an electro-optic material between the first and second substrates; and
    a color filter disposed on the first picture electrode, wherein viewed transversely to the first substrate, within the pixel, the color filter only partly covers the first picture electrode.

2. The display device of claim 1, wherein the reflective layer includes at least one aperture formed therein within the pixel.

3. The display device of claim 2, wherein a size of the aperture within the pixel is between 5% and 70% of a size of the first picture electrode.

4. The display device of claim 1, wherein the color filter covers at least 10% of the reflective layer of the first picture electrode.

5. The display device of claim 1, wherein the color filter covers at least 50% of the reflective layer of the first picture electrode.

6. The display device of claim 1, wherein the color filter covers at most 95% of the reflective layer of the first picture electrode.

7. The display device of claim 1, wherein the color filter covers between 10 and 95% of the reflective layer of the first picture electrode.

8. The display device of claim 1, wherein the color filter covers between 50 and 95% of the reflective layer of the first picture electrode.

9. The display device of claim 1, wherein the transparent layer includes indium tin oxide.

10. The display device of claim 1, wherein the reflective layer includes one of aluminum and silver.

* * * * *